US006927407B2

(12) United States Patent
Brüchle et al.

(10) Patent No.: US 6,927,407 B2
(45) Date of Patent: Aug. 9, 2005

(54) RADIATION SHIELDING ARRANGEMENT

(75) Inventors: Willi Brüchle, Weiterstadt (DE); Georg Fehrenbacher, Mühltal (DE); Torsten Radon, Ober-Mörlen (DE); Frank Gutermuth, Bensheim (DE)

(73) Assignee: Gesellschaft fur Schwerionenforschung mbH, Darmstadt (DE)

( * ) Notice: Subject to any disclaimer, the term of this patent is extended or adjusted under 35 U.S.C. 154(b) by 0 days.

(21) Appl. No.: 10/803,568

(22) Filed: Mar. 18, 2004

(65) Prior Publication Data

US 2004/0217307 A1 Nov. 4, 2004

(30) Foreign Application Priority Data

Mar. 19, 2003 (DE) ........................................ 103 12 271

(51) Int. Cl.[7] ........................... G21F 3/04; C04B 22/14

(52) U.S. Cl. ............................... 250/518.1; 250/496.1; 250/503.1; 250/505.1; 250/516.1; 250/517.1; 250/526; 250/515.1

(58) Field of Search ............................. 250/518.1, 526, 250/503.1, 393, 517.1, 370.9, 390.01, 390.03, 515.1, 496.1, 505.1, 516.1, 499, 506, 515, 501–503, 496, 518; 427/360, 361, 365, 367

(56) References Cited

U.S. PATENT DOCUMENTS

| | | | | | |
|---|---|---|---|---|---|
| 3,453,160 | A | * | 7/1969 | Darling et al. | 156/39 |
| 3,705,101 | A | | 12/1972 | Blum et al. | 252/478 |
| 3,995,163 | A | | 11/1976 | Colditz | 250/506 |
| 4,123,392 | A | * | 10/1978 | Hall et al. | 252/478 |
| 4,745,171 | A | * | 5/1988 | Sato et al. | 528/116 |
| 4,879,463 | A | * | 11/1989 | Wraight et al. | 250/269.2 |
| 5,398,266 | A | * | 3/1995 | Hayashi et al. | 376/288 |
| 2003/0225531 | A1 | * | 12/2003 | Lingren et al. | 702/23 |
| 2004/0217307 | A1 | * | 11/2004 | Bruchle et al. | 250/518.1 |
| 2004/0254419 | A1 | * | 12/2004 | Wang et al. | 600/8 |
| 2005/0025797 | A1 | * | 2/2005 | Wang et al. | 424/422 |

FOREIGN PATENT DOCUMENTS

| | | | | | |
|---|---|---|---|---|---|
| DE | 3607190 | | | 9/1987 | |
| DE | 3607190 | A1 | * | 9/1987 | C04B/22/14 |
| GB | 1200926 | | | 8/1970 | |
| GB | 0585184 | | | 3/1994 | |
| JP | 11202090 | | | 7/1999 | |
| JP | 11202090 | A | * | 7/1999 | G21F/1/10 |
| RU | 2083007 | | | 6/1997 | |
| RU | 2083007 | C | * | 6/1997 | G21F/3/04 |
| WO | 96/36972 | | | 11/1996 | |

OTHER PUBLICATIONS

"Corrosion of Steels from LBE", <http://www.physics.univ.edu/~hilife/rsrch.htm> (Aug. 2, 2001).*

Kovacs et al., "Solid and fly ash materials ofbrown coal power plants, their characteristics and utilisation", Acta Montanistica Slovaca, Rocnik 7 (2002) 3, 156–160 <http://actamont.tuke.sk/pdf/2002/n3/3kovacs.pdf>.*

GPDA (Gypsum Product Development Association), Healthier Building with gypsum products, No. 2, Sustainable Development, <http://www.gpda.com/docs/GPDA2.pdf>.*

* cited by examiner

*Primary Examiner*—John R. Lee
*Assistant Examiner*—Bernard E. Souw
(74) *Attorney, Agent, or Firm*—Ohlandt, Greeley, Ruggiero & Perle, L.L.P.

(57) ABSTRACT

A radiation shielding arrangement for shielding high-energy neutron radiation and gamma radiation from high-energy particle accelerators or storage rings includes a shielding element made of water-containing material, for example with chemically bound water or water of crystallization, in particular gypsum. The water component of the material preferably makes up at least 5, 10 or 20 percent by weight. The hydrogen nuclei or protons contained therein moderate neutrons in a virtually ideal manner because of the almost identical mass and the maximum pulse transformation associated with this.

19 Claims, 2 Drawing Sheets

RADIATION SHIELDING ARRANGEMENT

CROSS-REFERENCE TO RELATED APPLICATION

The present application claims priority of application Ser. No. 10 312 271.0 filed on Mar. 19, 2003 in Germany.

1. Field of the Invention

The invention relates to a radiation shielding arrangement in general and in particular to a radiation shielding arrangement for shielding neutron radiation and gamma radiation from particle accelerators or particle storage rings, especially for synchrotron radiation sources.

2. Background of the Invention

During the acceleration of particles, biologically damaging radiation is produced, in particular gamma radiation, that is to say high-energy photon radiation or electromagnetic radiation. In order to shield gamma radiation, concrete has typically been used until now.

However, in recent decades, the possible maximum energy and intensity of the particles in particle accelerators, in particular in those which are built close to the ground surface, have increased. These include synchrotron facilities for producing synchrotron radiation, the new free electron laser (FEL) TESLA at DESY in Hamburg and new accelerator installations at the Gesellschaft für Schwerionenforschung (GSI) (Heavy Ion Research Company) in Darmstadt. In future accelerators, in particular synchrotrons, particle energies in the range of several hundred GeV or even greater than 1 TeV are to be expected.

However, in such high-energy accelerators, it is not only high-energy photon radiation which occurs but, to a particular extent, fast neutrons are also generated. However, the latter can even occur at particle energies in the MeV range and are particularly biologically active, that is to say damaging. For instance, in the case of the synchrotrons described above with particle energies of a few 100 MeV or greater than 1 TeV, a substantial number of fast neutrons with energies in the region of 100 MeV are generated. On the other hand, however, concrete is less suitable for shielding fast neutrons.

Not only for such accelerators and storage rings, but also for target devices and experimental and analytical devices, there is a need for effective radiation shielding. Effective radiation shielding shields fast neutrons effectively in the MeV or even GeV range, which, as compared with electromagnetic radiation and with thermalized or at least relatively slow neutrons in the region of a few electron volts (eV), represents a completely new requirement. It is precisely the combination of effective shielding against electromagnetic radiation and, at the same time, a gainst fast neutrons that proves to be difficult in practice.

A further problem results from activation, (e.g., as a result of the fast neutrons), which partly leads to long-lived radionuclides. This makes the breakdown and the disposal of the shielding material extremely problematic. In this regard, too, there is a need for an advantageous alternative to concrete.

Furthermore, the above-mentioned development towards higher energies is of course associated with a considerable increase in the size of the installations. For example, HERA has a periphery of 6.3 km, so that cost savings are of particular interest.

BRIEF SUMMARY OF THE INVENTION

It is therefore an object of the present invention to provide a radiation shielding arrangement which shields both gamma radiation and fast neutrons effectively and can be produced cost-effectively on a large scale.

It is a further object of the invention to provide a radiation shielding arrangement which exhibits low activation even at high gamma and neutron energies.

It is a further object to provide a radiation shielding arrangement which avoids or at least reduces the disadvantages of the prior art.

The object of the invention is already achieved in a surprisingly simple way by the subject of the independent claims. Advantageous developments are the subject of the subclaims.

The radiation shielding arrangement according to the invention advantageously contains a shielding element made of water-containing material, for example with chemically bound water, in particular water of crystallization. The water component of the material preferably makes up at least 5, 10 or 20 percent by weight. The hydrogen nuclei or protons contained therein moderate neutrons in a virtually ideal manner because of the almost identical mass and the maximum momentum transfer associated with this.

The shielding element preferably consists at least 75% by weight, at least 90% by weight or substantially completely of gypsum. The use of gypsum, in particular a gypsum wall substantially comprising bound or cured gypsum, chemically $CaSO_4*2H_2O$, has proven to be particularly suitable, since the calcium absorbs gamma radiation relatively effectively because of its atomic charge of 20. The bound water of crystallization, with a proportion by weight of about 20 with respect to the total weight of the gypsum, in turn provides the protons.

As opposed to normal concrete which, apart from relatively small quantities of calcium, aluminium, iron or considerably more expensive barium, in the case of heavy concrete, contains silicon with the atomic number 14 as main constituent, calcium, with the atomic number 20, shields gamma radiation even better. This at least balances out the density difference between gypsum (2.1 g/cm$^3$) and normal concrete (2 to 2.8 g/cm$^3$) again. Therefore, given the same shielding action for gamma radiation, gypsum is advantageously lighter than concrete.

For example, the thickness of the shielding element is matched to the radiation spectra of a high-energy particle accelerator and/or high-energy particle storage ring for electrons, positrons or ions, in the case of a synchrotron, given particle energies of greater than 10 GeV or greater than 30 GeV.

With reference to the shielding of neutrons, it is further advantageous to provide a neutron absorber layer of a material which absorbs the moderated neutrons. For this purpose, boron, boron-paraffin, cadmium and/or gadolinium in particular have been proved to be effective.

A multilayer arrangement, in particular by attaching a separate neutron absorber layer to the gypsum wall, is particularly advantageous in this regard, since the stability of the gypsum is maintained. Preferably, therefore, in the case of this embodiment, no boron or other neutron-absorbing material has to be mixed into the gypsum.

Alternatively or additionally, the arrangement can be constructed modularly, for example in blocks.

Nevertheless, it is also advantageous to provide single-sided or two-sided loadbearing layers or formwork. For example layers of concrete, which have the effect of a dual benefit: stabilization and additional shielding against gamma radiation. Depending on the desired height, the concrete formwork can provide the necessary stability, so that at use can be made of a radiation shielding arrangement whose gypsum wall would not be self-supporting on its own but, in conjunction with the formwork, is then self-supporting. That is to say, the radiation shielding arrangement exhibits self-supporting stability properties on account of the loadbearing layer or loadbearing layers. The thickness of the loadbearing layer is dimensioned accordingly.

A neutron absorber layer, which contains a neutron-absorbing material, is preferably also provided. This is fitted to the side facing away from the accelerator, in particular directly to the shielding element. The neutron absorber layer contains, for example, boron, boron-containing glass or boron-paraffin.

Furthermore, the neutron absorber layer is preferably arranged within the formwork and/or between the formwork and the gypsum wall.

According to a particularly preferred embodiment of the invention, the concrete formwork itself contains a neutron-absorbing material, for example a boron-containing material. It is possible, for example, for boric acid or boron carbide to be admixed with the formwork material, for example the concrete. However, it has proven to be still more advantageous if the formwork has boron-containing glass. This is considerably less expensive than boron carbide and, even if it is mixed in, maintains the stability of the concrete better than boric acid. Boron-containing glass can be added in particular instead of or in addition to additives that are normally used, such as shingle. Alternatively or additionally, the material of the shielding element, in particular of the gypsum, can contain boron-containing glass.

The use of gypsum from flue gas desulphurization plants (known in German as REA gypsum) is particularly preferred. Millions of tons of this are dumped at great expense on spoil heaps. In Germany, over 3 million tonnes of REA gypsum are accumulated every year. Therefore, the power supply utilities are even thankful under certain circumstances if they can give the material away.

Astonishingly, there are many advantages to using REA gypsum.

Firstly, use is made of a material whose physical shielding action is better than that of concrete.

Secondly, the REA gypsum is chemically very pure, as a result of which long-lived radioactivities in elements having a high atomic number are produced to a reduced extent. Therefore, from the point of view of activation, REA gypsum is also more suitable than concrete. Thirdly, the power supply utilities no longer have to dump at great expense the gypsum which accumulates as waste during the flue gas desulphurization. Even the transport is at present still subsidized, since Deutsche Bahn [German Railways] also disposes of gypsum.

Furthermore, the inventors have discovered that, in order to shield the coming generations of high-energy particle accelerators and/or high-energy particle storage rings, which can supply particle energies of the order of magnitude of 100 GeV to 1 TeV or more, shielding elements or gypsum walls of about 1 m to 10 m, preferably 2 m to 8 m, particularly preferably 4 m to 7 m, thickness will become necessary. The amount of gypsum could therefore be at least 100 000 tons or even a multiple of this, depending on the accelerator.

The radiation shielding arrangement according to the invention is therefore designed, in particular with regard to the shielding effect and the thickness of the shielding element, for shielding neutron radiation and gamma radiation from high-energy particle accelerators, storage rings, target, experimental and/or analytical devices, in particular at particle energies greater than 1 GeV or even greater than 10 GeV.

In the following text, the invention will be explained in more detail using exemplary embodiments and with reference to the drawings.

DETAILED DESCRIPTION OF THE INVENTION

A simulation calculation was carried out with regard to the radiation which is produced when 30 GeV protons are shot at a 10 cm thick iron target. This corresponds approximately to the conditions which prevail in high-energy accelerators, in which the invention is intended to be used. In this case, a substantial proportion of fast neutrons with energies in the range up to a few GeV is produced.

Figure 1:
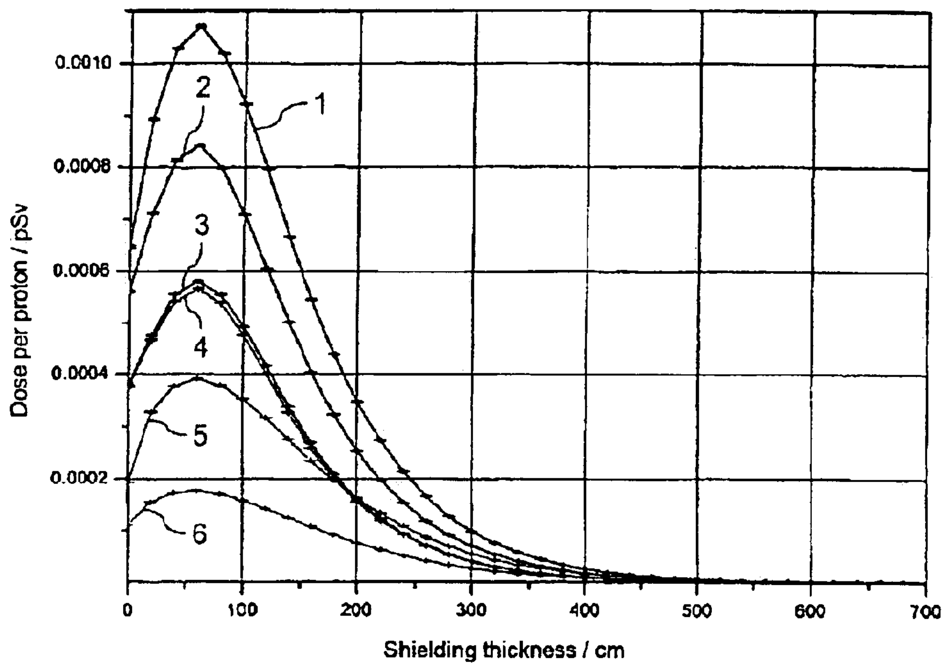
FIG. 1 shows results from a Monte Carlo simulation calculation.

FIG. 1 shows the simulation results of the penetrating dose or residual radiation dose through a shielding element or a shielding wall in picosievert (pSv) per proton as a function of the shielding or wall thickness in centimeters (cm).

The results are classified in accordance with neutron dose and electromagnetic radiation dose (gamma dose) and the total dose in each case for gypsum and concrete.

In this case:

curve 1 represents the total dose for concrete, curve 2 represents the total dose for gypsum, curve 3 represents the gamma dose for concrete, curve 4 represents the gamma dose for gypsum, curve 5 represents the neutron dose for concrete, and curve 6 represents the neutron dose for gypsum.

It can be seen that, in particular, the maximum neutron dose for gypsum is lower by more than a factor of 2, that is to say the shielding action is higher by more than a factor of two than for concrete, and the shielding with regard to the total dose is approximately 20% to 25% better there in the case of gypsum than in the case of concrete.

The maximum of the curves represents the secondary radiation equilibrium, at which a weakening effect begins. The secondary radiation equilibrium thickness lies approximately between 60 cm and 70 cm.

This considerably higher shielding action of the neutron dose from gypsum as compared with concrete at the high neutron energies produced by such high-energy particle accelerators was also completely surprising to specialists in the field of accelerator technology.

The result of the calculations is that, given a total number of $10^{12}$ protons and even with a wall thickness of 4 m, a total dose of only about 25 microsievert ($\mu$Sv) penetrates the wall.

In the following text, the advantages with regard to the activation of gypsum as compared with concrete will be indicated.

Table 1 shows values for the production of radioactivity during a 30-year radiation operation and the subsequent decay time of 5 years for concrete and gypsum.

The radionuclides mentioned in Table 1 are primarily generated, namely H-3, Na-22, Mn-54 and Fe-55. The values for the activity are normalized to the total activity of gypsum.

TABLE 1

| Nuclide | C_i Concrete | C_i Gypsum | C_i/R_I Concrete | C_i/R_I Gypsum |
|---|---|---|---|---|
| H-3 | 1.01E+00 | 9.74E−01 | 6.05E−02 | 5.86E−02 |
| Na-22 | 1.20E−01 | 2.61E−02 | 4.34E+00 | 9.41E−01 |
| Mn-54 | 1.03E−03 | 0.00E+00 | 1.24E−02 | 0.00E+00 |
| Fe-55 | 7.63E−02 | 0.00E+00 | 1.38E−03 | 0.00E+00 |
| Total | 1.20E+00 | 1.00E+00 | 4.41E+00 | 1.00E+00 |

Here:
C_i is the specific activity in becquerel per gram [Bq/g], and
C_i/R_i is the ratio of the specific activity to be released and the respective release value in accordance with the radiation protection law applicable in Germany at the time of the application.

It can be seen that, in gypsum, a radioactivity that is lower by a factor of about 1.2 is produced. Furthermore, the type of radioactivity produced. That is to say, the distribution of the radionuclides produced is more advantageous in the case of gypsum than in the case of concrete, if the release values in accordance with the current German radiation protection law are taken as a scale (factor 4.41). The result of this is that the costs for subsequent disposal after ending the utilization of the radiation shielding arrangement according to the invention will be lower than in the case of conventional shielding.

Figure 2:
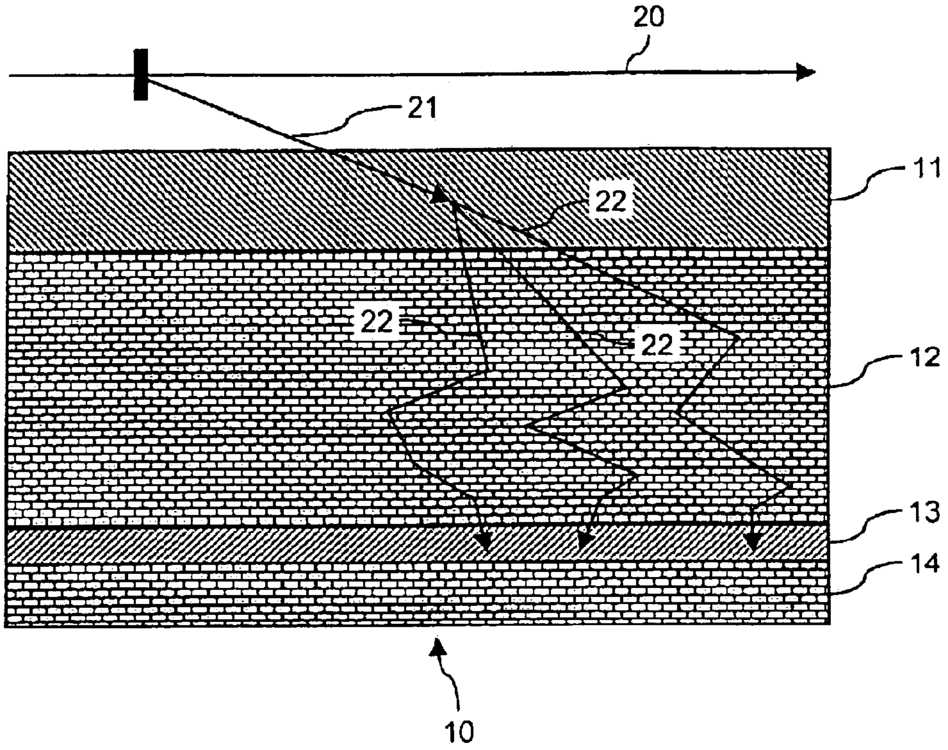
FIG. 2 shows a schematic cross section through an exemplary embodiment of a radiation shielding arrangement according to the invention.

FIG. 2 shows a multilayer radiation shielding arrangement 10 having a first layer or spallation layer 11 facing the radiation source or the particle beam 20 and consisting of or containing a metal, in particular with an atomic mass>50 atomic mass units (amu), for example iron. Arranged immediately adjacent to the spallation layer 11 is a first shielding element, a wall or a first shielding layer 12 consisting of or containing a material for retarding neutrons, for example gypsum and/or concrete. Immediately adjacent to the first shielding element 12 is a neutron absorber layer 13 consisting of or containing a material which is suitable for the absorption of thermalized neutrons, for example boron, cadmium or gadolinium. Again arranged immediately adjacent to the neutron absorber layer 13 is a second shielding layer 14, which has a lower thickness than the wall 12, consisting of or containing a material for retarding neutrons, for example gypsum and/or concrete.

The effect of the iron is, inter alia, spallation reactions, induced by the fast or high-energy neutrons 21, which in turn liberate neutrons 22 of lower energy. This achieves a first indirect moderation.

After that, the spallation neutrons 22 are retarded further in the wall 12, in order then finally to be caught by the atomic nuclei of the neutron absorber layer 13 and to be absorbed.

The material for the spallation layer 11 can come from the disposal of materials from nuclear installations, where weakly activated metals accumulate in large quantities.

It can be seen by those skilled in the art that the invention is not restricted to the exemplary embodiments described above, and that the invention can be varied in many ways without departing from the spirit of the invention.

What is claimed is:

1. A radiation shielding arrangement for shielding neutron radiation and gamma radiation from particle accelerators, storage rings, target, experimental or analytical devices, comprising at least one shielding element including a gypsum wall, wherein said gypsum wall includes bound water, and wherein said gypsum wall has a thickness that is matched to a radiation spectra of a high-energy particle accelerator.

2. The radiation shielding arrangement according to claim 1, wherein said gypsum is in a bound state in a chemical composition $CaSO_4*2H_2O$.

3. A radiation shielding arrangement for shielding neutron radiation and gamma radiation from particle accelerators, storage rings, target, experimental or analytical devices, comprising at least one shielding element including a gypsum wall that includes gypsum, wherein said gypsum includes bound water, and wherein said gypsum wall has a thickness greater than or equal to a secondary radiation equilibrium thickness.

4. A radiation shielding arrangement for shielding neutron radiation and gamma radiation from particle accelerators, storage rings, target, experimental or analytical devices, wherein said shielding arrangement has a multilayer construction and comprises at least a first layer and a second layer, and wherein said first layer is a spallation layer and said second layer is a neutron retarding layer.

5. The radiation shielding arrangement according to claim 4, wherein said shielding arrangement has a modular construction.

6. The radiation shielding arrangement according to claim 4, wherein said shielding arrangement includes a loadbearing layer arranged on a first side of said shielding element and as at least a minimum thickness dimensioned such that said at least one shielding element and said loadbearing layer are self-supporting.

7. The radiation shielding arrangement according to claim 4, wherein said loadbearing layer includes concrete formwork.

8. The radiation shielding arrangement according to claim 4, wherein said shielding element has two sides, wherein said concrete formwork is on said sides.

9. The radiation shielding arrangement according to claim 4, further comprising a neutron absorber layer having a neutron-absorbing material.

10. The radiation shielding arrangement according to claim 4, further comprising a neutron absorber layer having boron, cadmium and gadolinium.

11. A radiation shielding arrangement for shielding neutron radiation and gamma radiation from particle accelerators, storage rings, target, experimental or analytical devices, comprising:

at least one shielding element made of a first material including bound water; and a neutron absorber layer having boron-paraffin.

12. The radiation shielding arrangement according to claim 8, wherein a neutron absorber layer is arranged within said concrete formwork or between said concrete formwork and said gypsum wall.

13. The radiation shielding arrangement according to claim 6, wherein said loadbearing layer includes a neutron-absorbing material.

14. A radiation shielding arrangement, for shielding neutron radiation and gamma radiation from particle accelerators, storage rings, target, experimental or analytical devices, comprising at least one spallation layer including a material wherein spallation reactions are triggered by means of neutron irradiation.

15. The radiation shielding arrangement according to claim 14, wherein said material is a metal.

16. A use of gypsum from flue gas desulphurization plants for producing a radiation shielding arrangement for shielding neutron radiation and gamma radiation from high-energy particle accelerators, storage ring, target, experimental or analytical devices, wherein said shielding arrangement has a thickness that is matched to a radiation spectra of a high-energy particle accelerator.

17. A use of a shielding element that contains gypsum for shielding radiation from a device selected from the group consisting of a particle accelerator, a particle storage ring, a target device, an experimental device and an analytical device wherein said shielding element has a thickness that is matched to a radiation spectra of a high-energy particle accelerator.

18. A radiation shielding arrangement for shielding neutron radiation and gamma radiation from particle accelerators, storage rings, target, experimental or analytical devices, comprising at least one shielding element including a gypsum wall that includes gypsum, wherein said gypsum includes bound water, and wherein said gypsum wall has a thickness that is matched to a radiation spectra of a high-energy particle storage ring for particles selected from the group consisting of electrons, positrons and ions.

19. The radiation shielding arrangement according to claim 1, wherein said gypsum wall thickness is selected from the group consisting of at least 2 m, at least 5 m and at least 7 m.

* * * * *